United States Patent

Nasvytis

[15] 3,672,244

[45] June 27, 1972

[54] FLYWHEEL AUTOMOTIVE VEHICLE

[72] Inventor: Algirdas L. Nasvytis, 10823 Magnolia Drive, Cleveland, Ohio 41706

[22] Filed: April 8, 1970

[21] Appl. No.: 26,713

[52] U.S. Cl.................................................74/859, 74/751
[51] Int. Cl.........................................B60k 21/00, F16h 3/74
[58] Field of Search............................................74/751, 859

[56] References Cited

UNITED STATES PATENTS

| | | | |
|---|---|---|---|
| 1,162,593 | 11/1915 | Fieux | 74/751 |
| 1,335,249 | 3/1920 | Leymaire | 74/751 UX |
| 1,736,663 | 11/1929 | Nelson | 74/751 |
| 2,137,574 | 11/1938 | Kromer | 74/751 UX |
| 2,803,151 | 8/1957 | Clerk | 74/751 |

Primary Examiner—Arthur J. McKeon
Attorney—Hill, Sherman, Meroni, Gross & Simpson

[57] ABSTRACT

An automotive system employing a high velocity, moderate mass flywheel capable of storing and rapidly dissipating large supplies of kinetic energy coupled with a transmission adapted to permit the smooth release of stored kinetic energy from the flywheel to the vehicle wheels, and a charging means for supplying kinetic energy to the flywheel at relatively low energy levels. The system provides substantial fuel economy and pollution relief through an efficient energy-conversion system.

5 Claims, 4 Drawing Figures

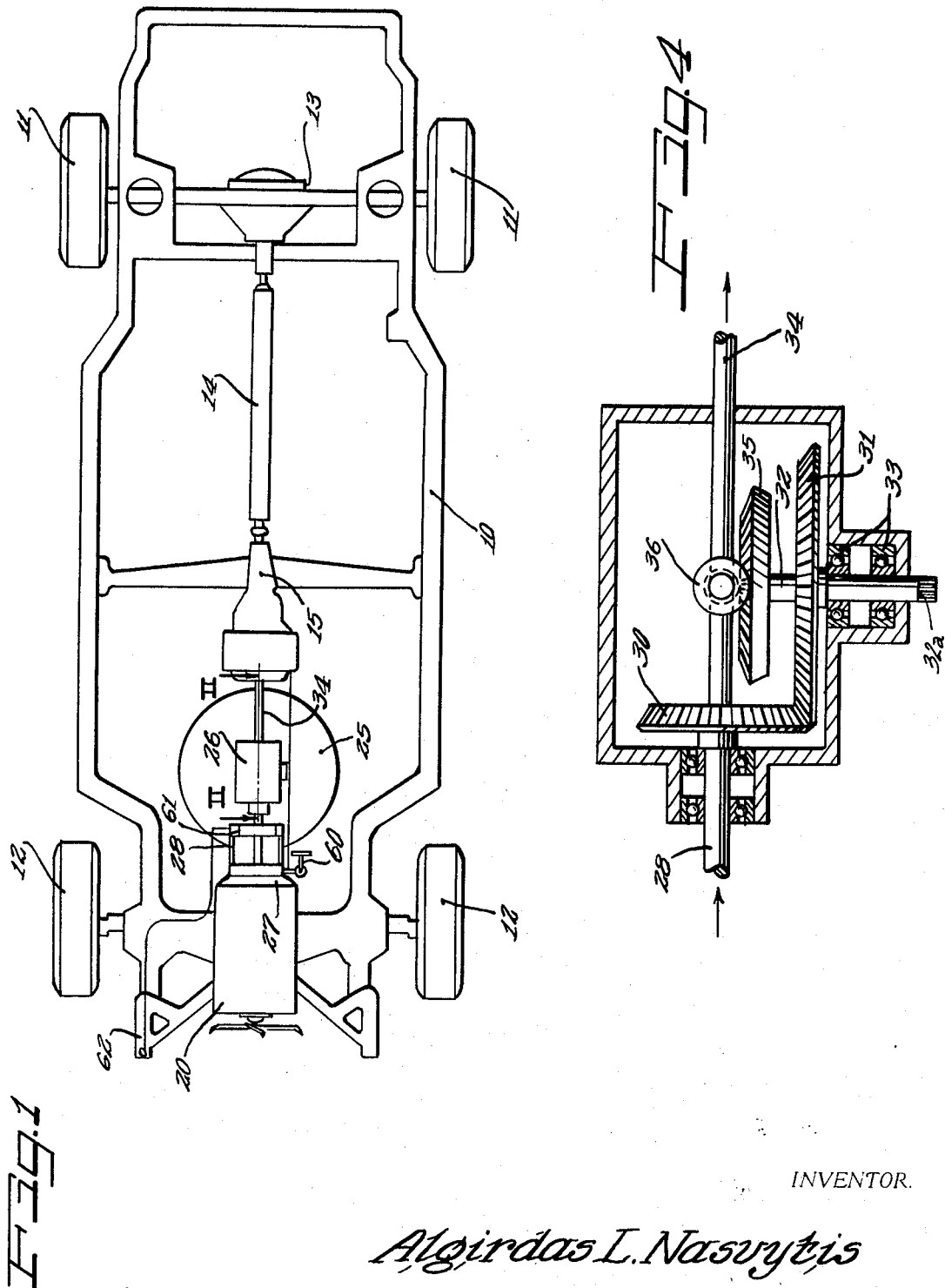

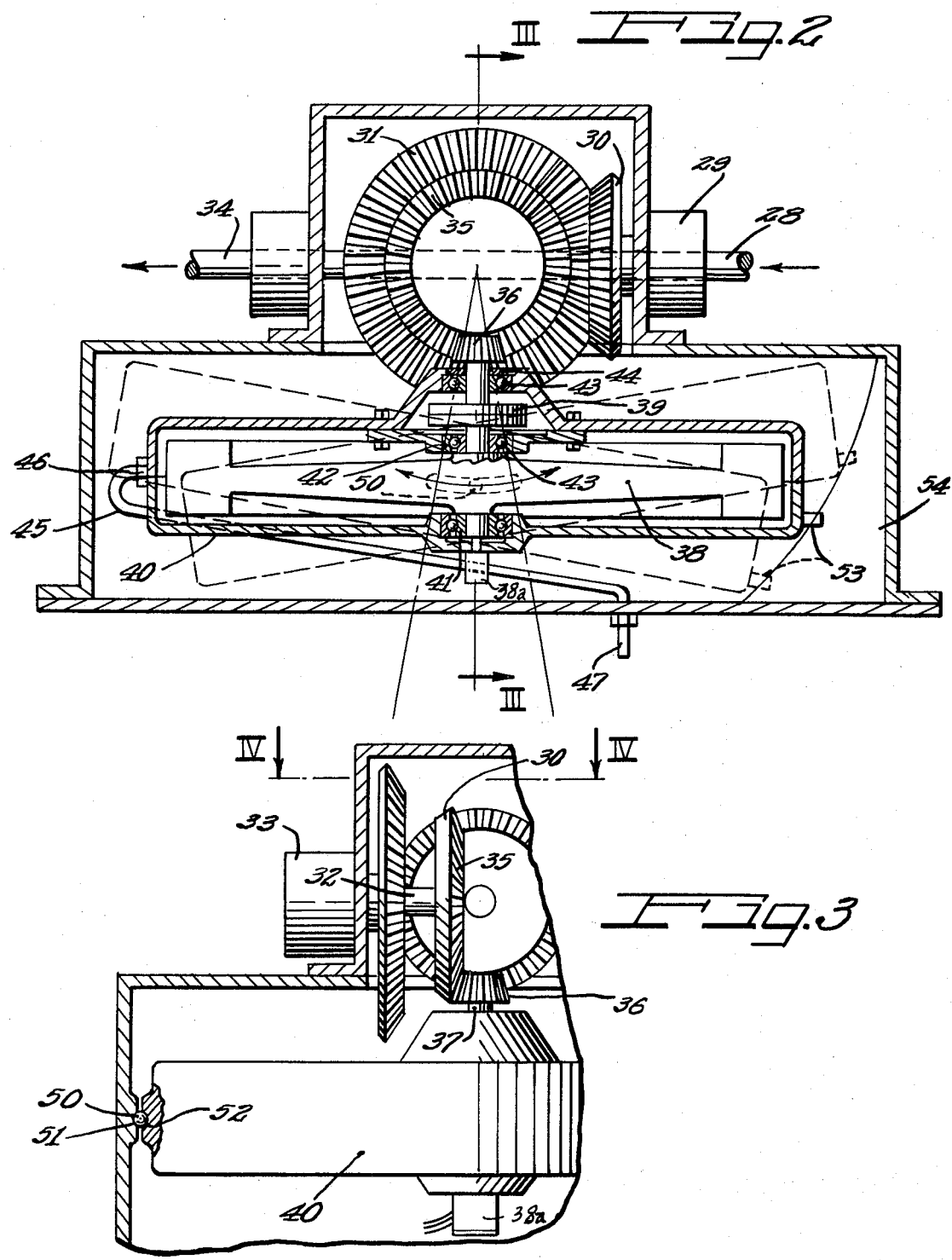

FLYWHEEL AUTOMOTIVE VEHICLE

BACKGROUND OF THE INVENTION

As those familiar with the field of automotive manufacture are aware, automotive vehicles have, since the beginning of the 20th century, continually increased in horsepower. One of the major factors in the desire of the public to have high powered automotive vehicle engines, is the desire to have rapid vehicle acceleration upon the operator's call. In conventional automotive systems, the only satisfactory way of achieving high acceleration has been considered the utilization of an extremely high powered vehicle engine. Such engines have, in recent times, employed a piston displacement of as high as 500 cubic inches, and have achieved a correspondingly extremely high torque throughout any normal driving range. In fact, the horsepower currently being applied to motor vehicles, particularly in the United States, is vastly in excess of the horsepower required for normal driving. One of the problems that has appeared with the increasing horsepower, is an increase in inefficiency of fuel combustion, and a very substantially increased volume of unburned hydrocarbons containing residual materials that have combined with the ambient air to cause serious air pollution problems. The seriousness of this problem has become acute in the last few years and new solutions to the problem are becoming essential to man's survival.

The occasional need for rapid acceleration and the simultaneous desire, in the public interest, to substantially reduce the consumption of hydrocarbon fuels, has posed a heretofore unsolved problem.

SUMMARY OF THE INVENTION

In accordance with the principles of the present invention, an automobile is provided which is driven by a stored power supply in the form of a flywheel. The flywheel is driven through a range of speeds, with a maximum speed approximating 15,000 rpm and a minimum of approximately 7,500 rpm. A flywheel "recharging" engine is employed which, when the flywheel velocity drops below a low limit, such as, for example, the 7,500 rpm above noted, will supply power to the flywheel until it reaches its design speed of 15,000 rpm or an intermediate speed such as, for example, 12,000 rpm. In the system of the present invention, the supply of recharging power operates substantially independently of the vehicle operator. The engine or motor is controlled solely by the velocity of the flywheel and the operator is in control only of the output of energy from the flywheel.

In accordance with the present invention, a relatively small, for example 20 to 40 horsepower vehicle engine, may be employed for storing kinetic energy in the flywheel. Such an engine is not only smaller but whatever horsepower is chosen, it may be designed to run at its engineered design efficiency in a relatively limited output speed range. In other words, the motor can be designed, after being geared down, to run substantially only in the range of 7,500 to 15,000 rpm (for example, the engine could be geared down so that the actual engine rpm approximates 2,000 to 4,000 rpm. This range may be narrowed even more if desired by operating the flywheel in the range of, for example, 10,000 to 15,000 rpm. As a result of constructing the flywheel of a mass and kinetic energy sufficient to operate a light weight or compact vehicle in the range of 2,000 pounds over a range of approximately 7 to 9 miles without starting the vehicle engine at all, a small electric motor may be applied, in tandem, in the automotive vehicle, and operated from house current, when the vehicle is stored in the garage, to maintain the flywheel at its maximum rpm. In such circumstances, short residential trips, which comprise a large percentage of vehicle travel, may oftentimes be accomplished without even starting the internal combustion engine of the vehicle, and in most cases, if the internal combustion engine is started on such trips, it will be run only for a few moments. The resultant decrease in pollutants and in consumption of the nation's fuel wealth are tremendous.

An infinitely variable transmission is provided between the flywheel and the vehicle wheels. It is necessary that an infinite ratio variation be provided since the flywheel is rotating at such high speeds that any abruptness in engagement thereof would be disastrous to the vehicle drive components. For example, if a flywheel of 24 inches diameter and only 3.3 inches thickness at the rim is provided, with a design weight approximating 215 pounds, the flywheel will store approximately 120 horsepower per minute in the rpm range of 7,500 to 15,000 rpm. Within this range, that energy will propel the vehicle approximately 7 to 9 miles with an average of 30 miles per hour, or, alternatively, accelerate such a 2,000 pound vehicle from a standstill to approximately 180 miles per hour. Manifestly, a jerk in the transmission of power at the standstill condition could destroy conventional gearing if not applied gradually. Accordingly, an infinitely variable transmission is desired to eliminate such problems. Such a transmission, incorporating a neutral clutch is to be found in my copending application, Ser. No. 730,883, now U.S. Pat. No. 3,554,054 and another embodiment may also be found in my now issued U.S. Pat. No. 3,468,192. In conventional vehicles, a transmission is provided which will accomplish approximately a 4:1 ratio range. At the same time, the engine in a conventional vehicle runs in an approximately 5:1 speed operational range. The combination of these two factors provide an over-all speed range on the order of 20:1. However, in accordance with the present invention where a flywheel is provided with substantially constant speed, the speed range of the vehicle must be provided by the transmission ratio range substantially alone. Accordingly, the transmission should provide in the present system a transmission range on the order of 20:1 up to 40:1. This speed ratio range, coupled with the requirement for an infinitely variable speed with an infinite ratio at the start establishes preference for transmissions of the type above mentioned, and disclosed in my earlier patents and patent applications. Additionally, my prior transmissions provide a mechanical efficiency substantially in excess of 90 percent at full load factor. Further, the transmissions of my design provide simple increases in over-all ratio through the addition of a few extra gear pairs. Such transmissions comprise input and output planetary sets in which the input planetary splits the power applied in the transmission into two branches. The output planetary adds the two branches again into a single output and the branches are each provided with countershafts for changing ratios. During the control process, there are times when one or another countershaft is stationary as the corresponding planetary output and input elements are stationary, and at such moment the ratio is changed on stationary elements without dissipating energy, wearing the parts unduly and/or providing a mechanical jerk to the system.

DESCRIPTION OF THE DRAWINGS

FIG. 1 is a plan view of a conventional vehicle with the energy system of the present invention shown mounted therein;

FIG. 2 is a cross-sectional view taken along the line II—II of FIG. 1;

FIG. 3 is a cross-sectional view taken along the line III—III of FIG. 2; and

FIG. 4 is a sectional view taken along the line IV—IV of FIG. 3.

DETAILED DESCRIPTION

As may be seen from a consideration of the drawings, a conventional vehicle frame 10 is supported on driven wheels 11 and dirigible wheels 12. The driven wheels 11 are driven through a conventional differential gear 13 by a drive shaft 14 which is driven, in turn, by a transmission 15. A motor 20 provides power to a flywheel 25 via a bevel gear train 26 and a one-way clutch 27.

The flywheel assembly of the present invention may be more clearly seen from a study of FIGS. 2 and 3. As there shown, the input drive shaft 28 from the clutch 27 is supported in a low friction bearing 29 and drives a bevel gear 30 which in turn drives bevel gear 31 carried by a shaft 32 supported in an anti-friction bearing 33. The shaft 32 carries a bevel gear 35 drivingly connected to a bevel pinion 36 carried by shaft 37 which is connected to a flywheel 38 by way of a clutch 39. The flywheel 38 is mounted for high velocity rotation within a housing 40 by way of anti-friction bearings 41 and 42. When the clutch 39 is engaged, kinetic energy stored in the flywheel 38 is released to the shaft 37 via clutch 39 and is returned to the main drive line, or output shaft 34. At such time as the clutch 39 is disengaged, the flywheel continues to rotate but the shaft 37, which is carried by the anti-friction bearing 43 stops rotation, thereby minimizing any leakage past seal 44. The seal 44 may be of any conventional design but it is intended to provide a substantial seal to the passage of air so that the housing 40 may be evacuated by way of a vacuum line 45 provided at an outlet 46 and connected to a vacuum pump by way of a connection 47. The pump, not shown, may comprise any conventional vacuum pump and is preferably driven directly by a fan belt from the shaft 28 at such time as power is applied thereto.

The flywheel housing 40 is mounted for pivotal motion, as shown in the dotted lines of FIG. 2, about an axis generally central of the axis of rotation of the gears 31, 35 and is supported for that movement by means of a pair of diametrically opposed balls 50 loosely rollable in the arcuate slots 51, 52 in the housing and flywheel respectively. The housing is prevented from rotation, additionally, by way of a projection 53 carried by the housing 40 and confined within a vertical slot 54. This oscillatable motion, generally in the plane extending longitudinally of the vehicle permits precession of the flywheel 39 upon the side roll, in either direction, of the vehicle, such as occurs during turning maneuvers.

Output shaft 34 comprises an input shaft for the transmission 15. The transmission 15 is, as above noted, preferably of a wide ratio range of planetary type, generally as described in my earlier patent and patent application above described. It is important that the transmission 15 be substantially infinitely variable, beginning with a substantially infinite ratio at the start or neutral condition. It will be understood, of course, that substantially any such transmission with such characteristic may be employed. It is my preference that the type transmission described in my earlier patent and patent application be used in view of its extremely high mechanical efficiency, both in the loaded and unloaded condition. Shifting of the transmission may be accomplished by any manual means such as a control pedal 60 connected with the drive shifting mechanism and biased upwardly into infinitely high ratio.

It will be understood from the above that the flywheel 38 is continuously rotating and is caused to rotate by an output from engine 20. When the flywheel 38 is rotating faster than the output shaft of the motor 20, a one-way clutch 27 permits such rotation with substantially no friction. Under these circumstances, energization of the motor 20 is under the control of an automatic start and stop control responsive to speed of the flywheel 38 rather than under the direct control of the vehicle operator as in conventional vehicles. The function of the motor is to recharge, and maintain charge in the kinetic energy storage of flywheel 38 rather than to drive the vehicle directly in normal use. Thus, a conventional electric starter motor, not shown, is operated by speed responsive switch 38a which energizes the starter motor upon decrease of flywheel speed to minimum design speed and stop the motor by disconnecting the ignition when the flywheel speed rises to its maximum design valve. Release of energy from the flywheel is by way of shaft 34 through the transmission 15 to the wheels 11, and is under the control of the operator in that the ratio of the transmission may be adjusted from a zero transmission of power to a substantially 1:1 drive ratio from the output shaft 34. When the flywheel and moving car wheels are directly connected by the variable speed drive, decreasing the ratio of the transmission increasingly transfers kinetic energy from the flywheel to the car wheels in linear relationship.

By pushing pedal 60 down the ratio is decreased and upon releasing the pedal 60 the ratio is increased. The speed of the change of the ratio determines the acceleration rate of the car. Thus, position of the pedal 60 determines the speed of the car relative to the speed of the flywheel. This system thus accurately and simply controls the speed of the vehicle and the flywheel supplies the energy necessary for acceleration and speed performance desired by the driver.

When the vehicle decelerates upon lifting the pedal, energy is absorbed by the flywheel, removing the necessity to use the brakes at ordinary driving conditions. This energy conservation provides considerable fuel savings especially in city driving. The brakes are used only in the emergency cases when very fast stoppage is required.

For reasons more fully advanced below, an electric motor 61 may be provided, preferably coaxial with the shaft 28 for rotating the shaft 28 when the engine 20 is not energized. A power connection 62 may be electrically coupled to conventional household current, and when so coupled, will cause rotation of the shaft 28 independently of whether the internal combustion engine 20 is in operation.

A consideration of the kinetics of the system will demonstrate that a relatively small flywheel can supply sufficient energy to satisfactorily operate a modern motor vehicle from a very small power source. For example, if the flywheel is 24 inches in diameter with a thickness of 3.3 inches, generally shaped as shown, and weighs 216 pounds, 120 horsepower per minute are available in the rpm range of 7,500 to 15,000. Such a store of kinetic energy will propel a light weight vehicle on the order of 2,000 pounds a range of approximately 7 to 9 miles at an average velocity of 30 miles an hour, or accelerate that same vehicle from a standstill position to approximately 180 miles per hour. Such velocities are within the range of extreme safety from the point of view of failure of the flywheel and appear adequate for satisfactory vehicle operation. If "high performance" in a heavier car is desired, high strength steel may be employed, permitting a flywheel velocity of 30,000 to 40,000 rpm with a 30-inch diameter flywheel supplying approximately 400 horsepower per minute. In ordinary driving, with a compact car extremely little horsepower is required. Acceleration imposes an energy requirement far in excess of the maintaining of a given velocity and, accordingly, a relatively small motor 20 may, as above noted, be employed while at the same time, this system is capable of providing extremely rapid acceleration upon short term demands.

It is preferred that the flywheel operate in a rarified atmosphere. For example, windage losses of a 24-inch flywheel in a standard air atmosphere would approximate 4 horsepower. At the same time, bearing losses, where 1½-inch bearings are employed, would approximate 0.05 horsepower, where antifriction bearings are employed. Such total losses are prohibitive for continuous operation of the flywheel. On the other hand, if the flywheel is running in a rarified atmosphere of approximately 0.02 atmospheres, the total horse power loss may be reduced from values above mentioned to approximately 0.1 horse power, with the result that the flywheel will rotate, once charged to capacity, for a period of over 24 hours before its speed reduces to the minimum rpm limit. As above noted, the container 40 may be maintained evacuated by means of a pump driven by the shaft 28, or, alternatively, where it is desired that the flywheel be continuously rotated, the evacuation may be accomplished by a small electrically driven pump operated from the storage battery.

As above noted, continuous rotation of the flywheel 38 along with the output shaft 37 would provide high losses at the seal 44 where such seal is sufficiently snug to permit maintainence of the rarified atmosphere within the container 40. Accordingly, the clutch 39, which may be of any low friction type clutch, is provided. The clutch 39, when de-energized, provides a disconnect which permits the flywheel to continuously operate without rotation of the shaft 37 and, accordingly, completely independently of the motor 20 or the output shaft 28. Accordingly, when energization of the system for driving purposes is desired, clutch 39 is energized before operation of the transmission 15. The vehicle can be started and driven direct from the engine 20 with the clutch 39 disengaged. For example, such direct driving is possible in case the flywheel is damaged or is stopped or has too low a rpm for proper operation. In this case the vehicle will be operating as a standard car with an undersized engine. In such a case a separate manual lever is provided to control the throttle valve of the engine and the automatic control from the flywheel is disconnected.

It will be observed that the above system provides a unique vehicle drive system of vastly improved efficiency. Where a conventional high horsepower engine operates in the range of substantially less than 10 percent of engine design power in ordinary city driving, with a resultant mechanical efficiency of substantially less than 10 percent, where accessory losses are included, the present system permits utilization of the engine at an efficiency in excess of 85 percent at substantially all times. These figures are confirmed in publications, for example, "The Automobile and Air Pollution", Part I, United States Department of Commerce, under date of Oct., 1967. In that publication, it may be observed that for city driving in a compact (2,000 pound) vehicle, at 30 miles per hour, a power requirement approximates only 5 horsepower and at 65 miles per hour, only 30 horsepower. If one assumes ideal engine operating conditions, the rate of fuel consumption at 65 miles per hour is approximately six times that at 30 miles per hour in a conventional vehicle. Taking into consideration the distances traveled, fuel consumption per mile is almost three times as great at the vehicle velocity of 65 miles per hour. At the same time, the average gasoline consumption for an American compact car is observed to be approximately 17 miles per gallon for city driving and approximately 22 miles per gallon for highway driving at 65 miles per hour. If the engine operating conditions could be made identical for city driving as for the relatively efficient high speed driving, which would be the case with my flywheel car, the mileage in the city should be approximately 22 miles per hour times 3, of 66 miles per gallon. Increased gas conservation is provided, and, at the same time, very substantially reduced air pollution is encountered as a result of the availability of superior engine design permitted by relatively narrow range of engine operation. It may be observed that heavier vehicles will provide a very substantial saving as well, since braking of the vehicle will also cause storage of the braking energy in the flywheel, thereby conserving the energy requirement otherwise imposed on the engine.

As above noted, the system of the present invention also contemplates the installation of a small electric motor 61. Such a motor, comprising a power rating of approximately 1 or 2 horsepower may be plugged into a home outlet while the vehicle is stored overnight to thereby maintain the flywheel at its fully charged condition. With the flywheel thus fully charged, the vehicle may be driven a number of miles without operation of the gasoline engine at all and, accordingly, for ordinary short shopping trips, it is feasible to operate this vehicle without initiation of operation of the internal combustion engine 20 at all. Further, shaft 32 may, if desired, have a splined extension 32a for attachment to an external power source at a service station, or the like, in case of emergency.

It will be apparent to those skilled in the art that I have provided a novel transmission and energy storage system for automotive vehicles. Since variations may be made without departing from the scope of the novel concepts of the present invention, it is my invention that the scope of the invention be limited solely by that of the hereinafter appended claims.

I claim as my invention:

1. In combination in a vehicle having driving wheels, a flywheel mounted on said vehicle for rotation about a substantially vertical axis, motor means drivingly connected to said flywheel via a one-way clutch, transmission means infinitely variably drivingly interconnecting said flywheel to said driving wheels to provide a range of transmission input to output ratios from infinity through one, means for varying the ratio of said transmission, and means responsive to the speed of said flywheel for increasing the output of said motor when the speed of the flywheel falls below a predetermined minimum speed, and thereby charge said flywheel, and decreasing the output of said motor when the speed of the flywheel increases to a predetermined maximum to thereby stop charging said flywheel.

2. The structure set forth in claim 1 wherein the flywheel axis is pivotally supported for limited pivotal motion about an axis transverse to the longitudinal axis of the vehicle.

3. The structure set forth in claim 1 including containing means housing said flywheel, means reducing the atmospheric pressure in said container, said flywheel including a clutch within said container providing selective engagement or disengagement of said flywheel from said transmission.

4. In combination in a vehicle having driving wheels, an energy-storing flywheel mounted on said vehicle for high speed rotation about a vertical axis, infinitely variable transmission means inter-connecting said flywheel to said driving wheels through a ratio range from infinity through one, and a foot pedal on said vehicle connected to said transmission means to decrease the ratio of the transmission upon depression of the foot pedal and to increase the transmission ratio upon release of the foot pedal.

5. The structure set forth in claim 1, wherein electric motor means is drivingly connected to said flywheel.

* * * * *